United States Patent
Kuhn et al.

(10) Patent No.: US 8,661,851 B2
(45) Date of Patent: Mar. 4, 2014

(54) PROCESS AND DEVICE FOR PRODUCING A STRUCTURE ON ONE OF THE FACES OF A GLASS RIBBON

(75) Inventors: Wolf Stefan Kuhn, Fontenay Le Vicomte (FR); Bertrand Strock, Mennecy (FR); Francois Pahmer, Paris (FR); Eric Bleuset, Maisons Alfort (FR)

(73) Assignee: Fives Stein (FR)

( * ) Notice: Subject to any disclaimer, the term of this patent is extended or adjusted under 35 U.S.C. 154(b) by 382 days.

(21) Appl. No.: 13/056,601

(22) PCT Filed: Jun. 30, 2009

(86) PCT No.: PCT/IB2009/052828
§ 371 (c)(1),
(2), (4) Date: Jan. 28, 2011

(87) PCT Pub. No.: WO2010/013149
PCT Pub. Date: Feb. 4, 2010

(65) Prior Publication Data
US 2011/0162411 A1    Jul. 7, 2011

(30) Foreign Application Priority Data

Jul. 30, 2008  (FR) .................................... 08 04344

(51) Int. Cl.
C03B 13/04 (2006.01)
C03B 13/08 (2006.01)

(52) U.S. Cl.
USPC ................................................ 65/94; 65/255

(58) Field of Classification Search
USPC ............................................ 65/93, 94, 255
See application file for complete search history.

(56) References Cited

U.S. PATENT DOCUMENTS 1,662,295 A * 3/1928 Burgess ............................ 65/94
1,674,856 A   6/1928 Edward
3,442,748 A * 5/1969 Huart ............................. 428/143

(Continued)

FOREIGN PATENT DOCUMENTS

DE  3808380 A1  9/1989
EP  0866487 A1  9/1998
FR  2893608 A1  5/2007

OTHER PUBLICATIONS

English language translation of the Written Opinion of the International Searching Authority dated Oct. 16, 2009.

Primary Examiner — Jason L Lazorcik
(74) Attorney, Agent, or Firm — The Belles Group, P.C.

(57) ABSTRACT

Process for producing a structure on one of the faces of a glass ribbon, carried out continuously using a printing device, in which: the printing device (8) is placed in a zone (A) in which the ribbon (B) is at an average temperature T1 insufficient for printing the pattern of the printing device onto the ribbon according to the nature of the pattern to be printed, to the pressure between the printing device and the ribbon and to the time during which the ribbon is in contact with the printing device; that face to be etched, upstream of the printing device (8), is heated so as to bring a limited and sufficient thickness of the ribbon to a temperature T2>T1 necessary for printing the pattern of the printing device onto the ribbon according to the nature of the pattern to be etched, to the pressure between the printing device and the ribbon and to the time during which the ribbon is in contact with the printing device, while still keeping the rest of the ribbon at a temperature close to T1; the heat flux transmitted through the ribbon by the heating means is such that the "printing number" is between 0.05 mm"1 and 2.00 mm"1 and preferably 0.3 mm" 1.

13 Claims, 3 Drawing Sheets

(56) References Cited

U.S. PATENT DOCUMENTS

| | | | |
|---|---|---|---|
| 4,746,347 A * | 5/1988 | Sensi | 65/94 |
| 5,224,978 A * | 7/1993 | Hermant et al. | 65/94 |
| 6,307,318 B1 * | 10/2001 | Kaake et al. | 313/586 |
| 6,679,085 B1 | 1/2004 | Singer et al. | |
| 2002/0035854 A1 | 3/2002 | Herzbach et al. | |
| 2007/0240754 A1 | 10/2007 | Gayout et al. | |

\* cited by examiner

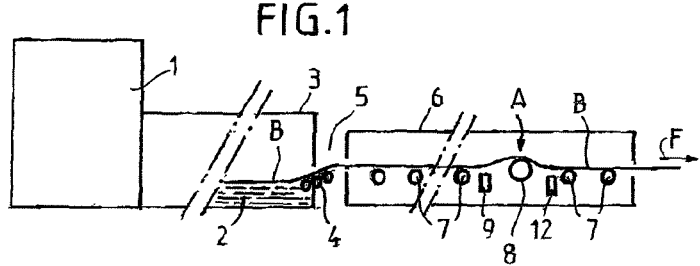
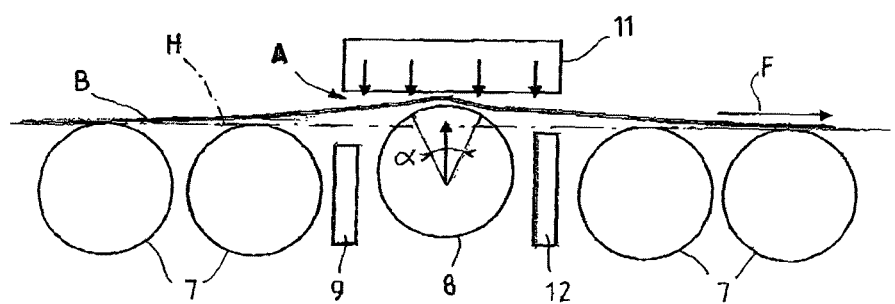
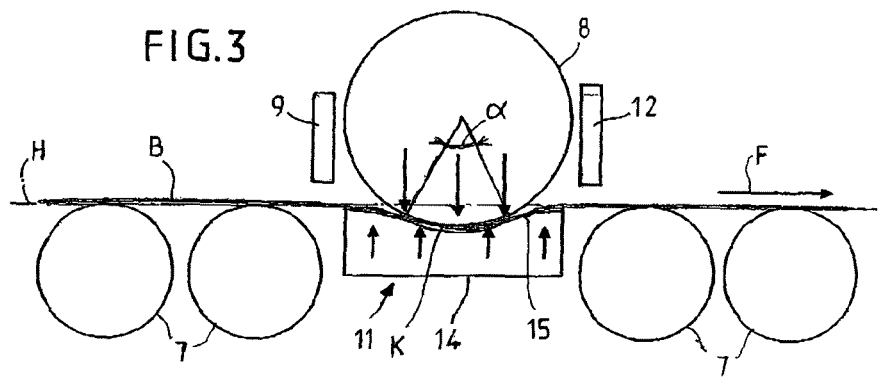

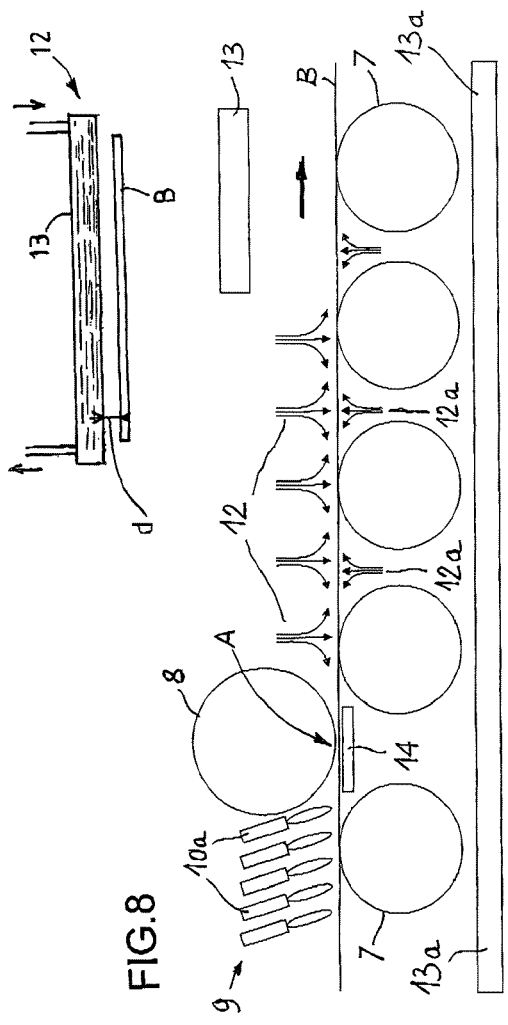

PROCESS AND DEVICE FOR PRODUCING A STRUCTURE ON ONE OF THE FACES OF A GLASS RIBBON

CROSS REFERENCE TO RELATED APPLICATIONS

This application is a National Phase filing under 35 U.S.C. §371 of PCT/IB2009/052828 filed on Jun. 30, 2009; and this application claims priority to Application No. 0804344 filed in France on Jul. 30, 2008 under 35 U.S.C. §119; the entire contents of all are hereby incorporated by reference.

The invention relates to a method of creating a structure using an engraving roll on one of the faces of a ribbon of glass, produced continuously.

The term "structure" denotes a collection of recesses and of reliefs engraved on the relevant face of the ribbon of glass.

The invention relates more specifically, although not exclusively, to a method such as this for manufacturing flat glass intended for modules equipped with photovoltaic cells.

It will be recalled that photovoltaic cells allow light energy, particularly the energy of sunlight, to be converted into electrical energy. The cells come either in the form of a thin film or in the form of a wafer and are fragile. They need to be protected not only mechanically, but also against moisture and corrosion. To this end, photovoltaic cells in the form of wafers are generally bonded against the underside of a protective panel of glass, and photovoltaic cells in thin-film form are deposited directly on the underside of the glass. The active surface of the cells is pressed against this flat face so that it receives the light through the glass panel.

Of course, it is desirable for the cells to capture the greatest possible amount of the light that falls onto that face of the panel that is distant from the cells. To this end, attempts are made at reducing the light losses due to parasitic reflections on the said face distant from the cells.

In order to manufacture thin-film photovoltaic modules, use is notably made of sheets or ribbons of float glass, obtained by forming on a bath of tin. The float glass method makes it possible to create faces that are very flat with very few defects. However, the smooth face of a panel of float glass, the face distant from the photovoltaic cells, gives rise to parasitic reflections and losses of active light.

In order to reduce this loss of light, certain manufacturers apply anti-reflective coatings to the smooth face in question, but such coatings are relatively expensive and constitute an additional step in the method on the production line.

It is also possible to obtain an anti-reflection surface by impressing a suitable structure thereon. Patent FR 2832814 provides examples of this type of structure.

It is therefore desirable to be able to manufacture, during one and the same process, continuously, a flat glass with one perfectly smooth face and a second face that exhibits an anti-reflective structure.

U.S. Pat. No. 4,746,347 proposes, in a float glass process, engraving the upper face of a ribbon of glass by pressing an engraving roll onto the top of the ribbon, in the chamber containing the bath of tin. An arrangement such as this is relatively complicated and makes interventions on the engraving roller, particularly for cleaning and/or changing it, difficult.

Patent application EP 1 057 791 A2 proposes various solutions for creating unevenesses on the lower face of a ribbon of float glass. In particular, the unevenesses may be created either using a roll that lifts the ribbon out at the end of the float bath, or by one of the rolls of an annealing furnace that follows on after the float bath. The conditions under which the structure or the engraving is created according to this last arrangement are not entirely satisfactory, because the condition of the ribbon of glass might not correspond to the optimum condition for good engraving and/or may entail too great a pressure with which the engraving roll is applied.

Furthermore, the use of one of the ribbon lift-out rolls has other disadvantages, for example the rapid soiling of the engraving roll with residual tin present on the ribbon or by tin vapours condensing onto this roll.

The solution proposed by patent EP 1 057 791 A2 does not fully address the stated problem because it is unable to create certain structures, notably structures with pronounced curvatures which would require excessively high pressures.

It is necessary to raise a sufficient thickness of the ribbon on the face that is to have the impression to a temperature $T2$ higher than that of the ribbon as it leaves the bath of tin in order to allow it to be impressed under good conditions.

Depending on the profile that is to be impressed, the pressure that has to be applied to the ribbon by the impression roll and the duration of impression, it is possible to determine the temperature $T2$ and the thickness to be heated, particularly by calculation or, for more complex cases, using numerical simulations or laboratory experiments.

In order to define the thermal parameters for impressing the ribbon, it is necessary to take into consideration:
  the thickness to be heated to a temperature close to $T2$,
  the speed of the ribbon,
  the thermal diffusivity of the glass,
  the enthalpy of the glass.

Float glass lines are capable of manufacturing a wide range of glass thicknesses, for example ranging from 0.5 to 25 mm. The profiles impressed on laminate glass lines also have highly varying depths and morphologies, for example depths ranging from 0.1 to 4 mm. The wide variety of these ranges of products on a given float glass line therefore entails complex thermal management in order to obtain the desired impression while at the same time avoiding overheating the glass, having too large an installation, or an excessive power consumption.

The invention makes it possible to define the appropriate parameters by proposing a method which makes it possible simply and quickly to determine the optimum conditions for heating and cooling the ribbon that is to be impressed to various depths over a vast range of float glass products.

Above all, it is an object of the invention to provide a method of the kind defined hereinabove, which makes it possible continuously, under optimal conditions, to create a ribbon of glass of which at least one face has a precise structure, which makes it possible to avoid, or at the very least to reduce appreciably, parasitic reflections, and which is able to do so for a broad range of production parameters.

According to the invention, the method of creating a structure using an impression device, particularly an engraving roll, on one of the faces of a ribbon of glass, particularly float glass, produced continuously, is characterized in that:
  the impression device is positioned in a zone at which the ribbon is at a mean temperature $T1$ that is insufficient for impressing onto the ribbon the pattern of the impression device according to the nature of the pattern to be engraved, the pressure between the impression device and the ribbon, and the duration of contact between the ribbon and the impression device,
  the face that is to be engraved is heated upstream of the impression device so as to raise a limited and sufficient thickness of the ribbon to a temperature $T2>T1$ necessary for impressing onto the ribbon the pattern from the impression device according to the nature of the pattern to be engraved, and the pressure between the impression device and the ribbon, and the duration of contact between the ribbon and the impression device, and the thermal flux transmitted to the ribbon by the heating device is such that the "impression number" ranges between 0.05 mm$^{-1}$ and 2.00 mm$^{-1}$ and is preferably 0.3 mm$^{-1}$, the "impression number" N$_{imp}$ being defined by the formula:

$$N_{imp} = \frac{depth_{T2}}{diffusivity_{thermal}} \cdot \frac{speed}{length_{heated}}$$

In the case of soda-lime glass, the temperature T2 advantageously ranges between 650° C. and 1100° C., preferably between 750° C. and 950° C., whereas the temperature T1 is 620° C. or lower, and higher than 570° C.

The structure may be created on the upper face or lower face of the ribbon.

The engraved face of the ribbon is rapidly cooled after the impression device in order rapidly to stabilize the engraved structure and return the ribbon to a temperature close to T1, throughout the thickness of the ribbon. When the engraving is performed on the lower face of the ribbon, which then passes over carrying rolls, the engraved face of the ribbon is rapidly cooled after the impression device to a temperature of 620° C. or lower but higher than 570° C. in the case of soda-lime glass before the engraved face of the ribbon comes into contact with a carrying roll.

Advantageously, the thickness of the ribbon raised to the temperature T2 is such that the volume of glass raised to the temperature T2 is at least equal to the volume displaced by the engraving.

The method defined hereinabove is advantageously implemented in an installation for producing float glass, particularly after the exit from the bath or in the lehr that follows the float tank.

The invention also relates to a device for creating a structure on one of the faces of a ribbon of glass produced continuously using an impression device, characterized in that:

the impression device is positioned in a zone in which the ribbon is at a mean temperature T1 insufficient for the pattern of the impression device to be impressed on the ribbon according to the nature of the pattern to be engraved, the pressure between the impression device and the ribbon and the duration of contact between the ribbon and the impression device, a means of heating the face that is to be engraved is installed upstream of the impression device so as to raise a limited and sufficient thickness of the ribbon to a temperature T2>T1 necessary for the pattern of the impression device to be impressed on the ribbon according to the nature of the pattern to be engraved and the pressure between the impression device and the ribbon and the duration of contact between the ribbon and the impression device, while at the same time keeping the remainder of the ribbon at a temperature close to T1, the power transmitted to the ribbon by the heating means is such that the "impression number" N$_{imp}$ ranges between 0.05 mm$^{-1}$ and 2.00 mm$^{-1}$ and is preferably equal to 0.3 mm$^{-1}$.

According to the invention, the ribbon is cooled in such a way that the lower face of the ribbon in contact with the carrying rolls remains at a temperature of T1 or below but above the temperature T3 that corresponds to the temperature at which the glass sets. In the case of soda-lime glass, the temperature T3 is about 570° C.

According to the invention, the engraved face of the ribbon is rapidly cooled after the engraving roll in order rapidly to stabilize the engraved structure and return the ribbon to a temperature close to T1.

Advantageously, the device comprises a means of blowing gas, notably air, on the opposite side to the engraving roll in order to press the ribbon against the roll with an appropriate pressure.

The engraving roll may be positioned above the ribbon of glass in order to engrave the upper face of the ribbon, and the blowing means may consist of an air-blowing levitation table which supports the lower face of the ribbon.

The device is advantageously designed such that an arc of contact is established between the ribbon and the roll with an angular spread large enough to extent the contact time.

The means of heating the surface layer may comprise an array of burners extending transversely across the width of the ribbon and the flames of which are directed onto that face of the ribbon that is to be engraved.

The cooling means may be a radiative means, for example formed of a tube extending transversely across the width of the ribbon and through the inside of which there runs a coolant, particularly air or water, this tube being situated close to the engraved face.

The cooling means may also be a convective means which works by blowing a gas onto the ribbon.

According to the invention, there is a characteristic number that connects the heated length, the depth of impression, the speed of travel of the ribbon and the thermal diffusivity of the glass. This number, hereinafter known as the "impression number", makes it possible to determine the parameters of the heating in order to bring the required depth of ribbon up to a temperature T2. This number remains valid for a very wide range of production parameters and impression depths. The impression number N$_{imp}$ is given by the formula:

$$N_{imp} = \frac{depth_{T2}}{diffusivity_{thermal}} \cdot \frac{speed}{length_{heated}}$$

in which all the quantities used are given in SI units.

In this formula:

depth$_{T2}$ denotes the thickness of glass to be raised to the temperature T2 in order to impress the structure.

speed denotes the speed of travel of the ribbon of glass. The speed parameter is set by the "float" process as a function of the production and of the thickness of the ribbon.

diffusivity$_{thermal}$ denotes the thermal diffusivity of the glass which is a property intrinsic to the nature of the glass. In the case of soda-lime glass, this value varies very little in the temperature range required for impression. Thus it is 4.2× 10$^{-7}$ m$^2$/sec at 700° C. and 4.6×10$^{-7}$ m$^2$/sec at 1000° C. It is therefore possible to use a mean value of 4.4×10$^{-7}$ m$^2$/sec for satisfactory precision in determining the impression number.

length$_{heated}$ denotes the length, in the direction of travel, over which the ribbon is heated.

The impression number according to the invention makes it possible to define heating equipment that is appropriate for a wide range of production parameters, for example an impression depth of 0.2 to 4 mm for a ribbon speed of 2 to 30 m/min.

One exemplary embodiment of the invention is now described.

For a T2 depth of 0.4 mm, a ribbon speed of 15 m/min and a thermal diffusivity of $4.4 \times 10^{-7}$ m$^2$/sec, we get, for an impression number of 0.3 mm$^{-1}$, a heated length of 0.76 m.

The next step is to calculate the temperature reached by the heated face of the ribbon so as to check that it does not exceed a critical temperature detrimental to the quality of glass. The calculation is performed using the following formula:

$$T\max = T1 + 1.023 \cdot \left\{ \frac{20 \cdot speed \cdot depth_{T2}^2 + 11 \cdot dist_{imp} \cdot diffusivity_{thermal}}{length_{heated} \cdot diffusivity_{thermal}} \right\}^{0.3161} \cdot (T2 - T1)$$

In this formula, $dist_{imp}$ is the distance between the end of heating and the point of contact between the ribbon and the impression roll. It is advantageous for this to be chosen to be as short as possible so as to reduce the heat loss between heating and the impression point, preferably for this to be less than 20 cm.

For a temperature T1 of 600° C. and a temperature T2 of 830° C. and distance of 19 cm, we get a hot face temperature of 995° C.

Should this temperature exceed a critical value, for example 1100° C. in the case of soda-lime glass, it would be necessary to repeat the calculation using a slightly lower impression number, for example 0.2.

The next step is to determine the heat flux to be injected per metre width of ribbon. This is obtained using the following formula:

$$Q_{imp} = ER \cdot (Hg(T2) - Hg(T1)) \cdot speed \cdot depth_{T2} \cdot density_{glass}$$

In this formula, $Q_{imp}$ is the thermal power to be injected per metre width of ribbon, Hg is the enthalpy of the glass and $density_{glass}$ is the mean density of the glass.

The term ER expresses the energy ratio, that is to say the actual consumption of the device as compared with the energy required to raise the thickness $depth_{T2}$ to the temperature T2. ER is obtained from the following equation:

$$ER = 4.21 \cdot 10^{-7} \cdot \left[ \frac{depth_{T2}^2 \cdot speed}{(6.67 \cdot 10^{20} \cdot length_{heated} + 2 \cdot 10^{21} \cdot dist_{imp}) \cdot diffusivity_{thermal}} \right]^{-0.3197}$$

We thus have an ER factor of 4.5. This factor is closely connected to the heated length. It deteriorates when the impression number decreases. To optimize the device, it is therefore advisable for the impression number to be increased until a limit value, for example on the face temperature or the thermal flux density, is reached.

With this ER value equal to 4.5, we get a thermal flux to be injected of 354 kW/ml (kilowatts per linear metre), across the width of the ribbon.

Now that we know the heated length and the energy that has to be injected, we are able to calculate the thermal flux density $q_{ht}$ using the equation $$q_{ht} = \frac{Q_{imp}}{length_{heated}}$$

The flux density required is thus 454 kW/m$^2$. Once again, if the required flux density is greater than can be achieved by the available heating means, it is necessary for the impression number to be reduced slightly in order to increase the heated length.

The equations set out here provide a good estimate of the quantities using a simplified approach without the need for complex numerical simulation.

All of the simulations performed using the gauging method according to the invention by varying the various variables that are, for example, the impression depth, the speed of travel, the temperatures T1 and T2, the maximum acceptable temperature according to the grade of glass, lead to the field of validity of the impression number being limited to between 0.05 mm$^{-1}$ and 2 mm$^{-1}$. An impression number outside of this range would lead to anomalies such as an excessive flux density, too great a heated length, an excessive hot face temperature or deplorable energy efficiency.

For example, an impression number less than 0.05 mm$^{-1}$ would lead to unacceptable lengths for the heated zone and to heat fluxes that were too low giving rise to significant excessive energy consumption. An impression number greater than 2 mm$^{-1}$ would lead to excessive flux density values that can no longer be achieved using conventional heating means. At the same time, the surface temperature increases excessively and leads to overheating of the surface of the glass, causing it to deteriorate through bubbling and evaporation.

The best compromise is obtained for an impression number of 0.3 mm$^{-1}$, which allows very reasonable fluxes and lengths.

The invention also consists in a method of continuously creating a structure on one of the faces of a ribbon of float glass using an impression device in a zone situated after the bath of tin at which the ribbon is at a mean temperature T1 insufficient for the pattern of the impression device to be impressed onto the ribbon according to the nature of the pattern to be engraved, the pressure between the impression device, in particular an engraving roll, and the ribbon, and the duration of contact between the ribbon and the impression device, characterized in that:
  the face to be engraved is heated upstream of the impression device so as to raise, at the start of impression, a limited and sufficient thickness of the ribbon to a temperature T2>T1 necessary for impressing the pattern of the impression device onto the ribbon according to the nature of the pattern to be engraved and the pressure between the impression device and the ribbon, and the duration of contact between the ribbon and the impression device,
  the thermal flux is transmitted to the ribbon by induction or by microwaves at a frequency that is suitably chosen to limit the absorption to the thickness of the layer that is to receive the impression.

Apart from the provisions set out hereinabove, the invention consists in a certain number of other arrangements that will be discussed more fully hereinbelow with regard to some exemplary embodiments for soda-lime glass which are described with reference to the attached but nonlimiting drawings. In these drawings:

FIG. 1 is a schematic longitudinal section through a float glass manufacturing line, implementing the method of the invention.

FIG. 2 is a schematic view on a larger scale of part of the ribbon of glass with an engraving roll above it.

FIG. 3 shows, like FIG. 2, an alternative form of embodiment with an engraving roll situated above the ribbon of glass.

FIG. 4 is a schematic cross section through the ribbon of glass with an array of burners above it.

FIG. 5 is a schematic section through the ribbon of glass with a radiated cooling means above it.

FIG. 8 is a diagram in longitudinal vertical section of one exemplary embodiment of the invention.

Figure 6:
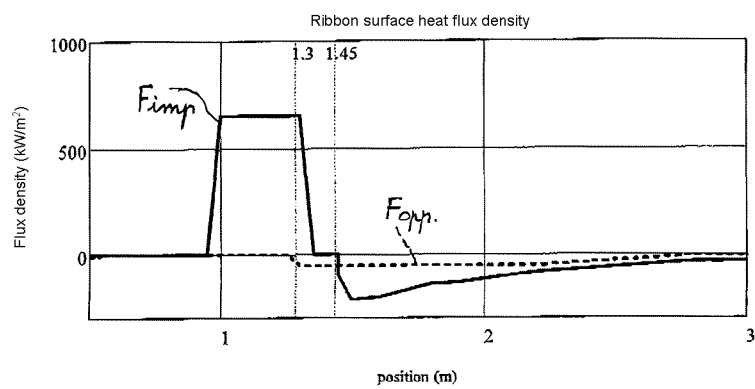
FIG. 6 is a diagram representing, on the ordinate axis, the thermal flux density imposed on the two faces of the ribbon, as a function of longitudinal position along the abscissa axis.

FIG. 1 of the drawing schematically depicts an installation for producing a ribbon of glass according to the float glass method.

The installation comprises a furnace 1 into which the materials, silicate sand, flux, limestone etc. used to manufacture the glass are introduced. A ribbon of glass B in the pasty state leaves the furnace 1 supported by a bath of molten tin 2 that occupies the lower part of a float chamber 3 under a reducing atmosphere, particularly an atmosphere of nitrogen and of hydrogen. The glass forms on the bath of tin at a temperature of between about 1000° C. and 600° C.

At the outlet end of the chamber 3, the ribbon of glass B is lifted out of the bath of tin and enters the "drossbox" (or bath exit) on metal rolls 4 known as "LORs" (lift out rollers). The ribbon B then passes through an open air space 5, over a length of a few tens of centimetres.

The ribbon B then enters a lehr 6 where the temperature of the ribbon of glass decreases gradually until it drops below the glass transition temperature Tgtt, which is 550° C. in the case of soda-lime glass. On leaving the lehr 6, the glass is at a moderate temperature (below 100° C.) that allows the glass to be cut up and handled.

Throughout its period in the lehr, the ribbon of glass is supported horizontally by rolls 7 rotated at the speed of travel of the ribbon. An adjustable tensile force F is applied to the ribbon B. The amplitude of the tension F allows the thickness of the ribbon B to be influenced.

The float glass method has the advantage of creating very flat surfaces with very few defects both on the lower face and on the upper face of the ribbon B. However, the lower face is more exposed to the risks of defects because of the possibility of soiling from the rolls 4 on which the ribbon B rests while it is still in a viscoelastic state.

The invention aims to provide, continuously, a ribbon of glass B of which at least one face has a structure, that is to say a collection of reliefs and of recesses, capable of creating an effect that prevents the light from reflecting, the other face preferably being left smooth, particularly in an application to photovoltaic cells.

The engraving of a structure on one face of a ribbon of glass according to the invention, takes the following parameters into consideration:
  whether glass is in a state of plasticity favourable to good engraving,
  the pressure of contact between the ribbon and the engraving roll,
  the setting of the engraved structure, avoiding critical stresses,
  the preservation of the surface finish of the non-impression face,
  the preservation of the flatness of the ribbon.

In order to create the structure on one of the faces of the ribbon of glass, under good conditions, use is made of the procedure that is explained hereinafter.

An impression device, preferably consisting of an engraving roll 8, is positioned at a point A where the ribbon B is at a mean temperature T1 insufficient for the pattern of the engraving roll to be impressed onto the ribbon of glass according to:
  the nature of the pattern to be engraved (particularly the shape of the pattern, its size and its depth);
  the pressure between the engraving roll 8 and the ribbon B;
  and the duration of contact between the ribbon and the engraving roll.

The impression device could consist of some means other than a roll, particularly of tapes defining a closed loop in a vertical plane parallel to the direction of travel of the ribbon or of an impression plate.

In the case of soda-lime glass, the temperature T1 is chosen to be 620° C. or lower. The point A at which the engraving roll is located can thus lie upstream of the lehr 6, in the lehr, or even outside of the lehr, downstream thereof.

The face that is to be engraved is heated upstream of the impression device, notably upstream of the engraving roll 8, so as to raise a limited and sufficient thickness of the ribbon B to a temperature T2 at the start of impression, greater than T1, necessary for the pattern of the engraving roll 8 to be engraved on the ribbon B according to the nature of the pattern to be engraved and the pressure between the engraving roll 8 and ribbon B and the duration of contact between the ribbon B and the engraving roll 8.

This heating is performed under conditions such that the remainder of the ribbon B maintains a temperature close to T1 and only the thickness of ribbon B involved in the engraving is heated.

Because, during engraving, the ribbon of glass remains at a relatively low mean temperature T1, with the exception of the surface layer involved in the engraving, the mechanical properties of the ribbon are able to avoid permanent deformation of the ribbon.

The temperature T2 is less than 1000° C., advantageously around 800° C. For preference, the temperature T2 is chosen so that the pressure necessary for engraving remains below 2 MPa.

The thickness of ribbon raised to the temperature T2 is such that the volume of glass raised to this temperature T2 is at least equal to the volume displaced by the engraving. In general, the thickness of ribbon raised to the temperature T2 is at least equal to the height of the reliefs, particularly at least equal to 1.5 times this height.

After the face of the ribbon has been engraved, this engraved face is cooled rapidly, downstream of the engraving roll 8, in order to preserve the engraved pattern, by setting it.

Advantageously, a cooling of the non-impression face of the ribbon contributes to limiting the increase in temperature at the centre of the ribbon so as to prevent the ribbon from softening again. This cooling will be gauged such that the temperature of the non-impression face of the ribbon is not below the temperature T3 at which the glass begins to solidify, namely about 570° C. in the case of soda-lime glass.

This cooling may be of the radiated type.

The engraving roll 8 may be positioned above the ribbon B, as illustrated in FIG. 2, or below, as illustrated in FIG. 3.

The face that is to be engraved may be heated by a heating means 9 installed just upstream of the engraving roll 8 and extending across the width of the ribbon B. This heating means 9 is situated on the same side of the ribbon B as the engraving roll 8. Heating may be performed by induction, microwave, blown hot air, radiation, plasma gas or any other known means.

One advantageous solution is for the heating means 9 to be produced in the form of an array 10 of vertical burners 10a (FIG. 4), the flame of which is directed onto the face that is to be heated, the array 10 being positioned transversely to the ribbon B, mainly at right angles to its direction of travel. Advantageously, an $H_2/O_2$ combustion is employed to obtain a very high heat transfer.

The face that is to be engraved may also be heated directly by the engraving roll 8 by fitting the latter with a heating means that allows the temperature of the roll table to be raised to a sufficient level.

The face subjected to engraving may be the lower face of the ribbon B as illustrated in FIG. 2. In such a case, the engraving roll 8 is generally raised up relative to the other upstream and downstream rolls 7, which are tangential to one and the same upper horizontal plane H. The contour of the roll 8 protrudes above the plane H so as to lift the ribbon B which is thus pressed under its own weight against the roll 8, which may be enough to create the pressure needed for engraving. In order to increase this pressure, it is possible to alter the amplitude of the tensile force F applied to the ribbon B, but when this is done, there is a risk that the thickness of the ribbon will become modified. It is also possible to provide a backing roll on the opposite face to the one subjected to the engraving.

Another solution for influencing the pressure with which the engraving roll 8 is pressed against the ribbon B is to provide a means 11 of blowing pressurized gas on the opposite side of the ribbon B to the roll 8, in the region of this roll. In the case of FIG. 2, in which the roll 8 is under the ribbon, a blowing box 11 is arranged above the ribbon B and above the roller 8 and extends across the entire width. The gas fed to the blowing means is advantageously preheated so as to avoid cooling the ribbon to a temperature below the temperature at which it begins to solidify.

A cooling means 12 is installed after the engraving roll 8, in the vicinity thereof, in order rapidly to cool the ribbon B in order to preserve the engraved pattern by setting the engraved face. The cooling means 12 may consist of an array for blowing cooled air. One advantageous solution that avoids turbulent air movements in the cooling zone then is to provide a radiative element 13 (FIG. 5) through which a cooling fluid, generally water, travels, running transversely to the ribbon B across its entire width, a short distance away. The element 13 may be situated at a distance d of the order of a few centimetres.

According to the alternative form of FIG. 3, the engraving roll 8 is positioned above the ribbon B which is supported by a gas-blowing, generally air-blowing levitation table 14 which supports the ribbon. The blowing is performed at sufficient pressure to keep the ribbon pressed against the roll 8. The levitation table 14 is positioned between two spaced-apart rolls 7.

The pressure with which the ribbon B is pressed against the roll 8 is higher than the pressure at which the air is blown in a ratio that corresponds more or less to the ratio of the area of the levitation table to the area of contact between the engraving roll 8 and the face of the ribbon that is to be engraved.

The pressure of the table is concentrated onto the limited area of contact between the engraving roll and the ribbon of glass. This contact area when making an impression in a flat ribbon, is determined by the depth and geometry of the structure that is to be impressed.

For a roll 400 mm in diameter and with a contact height of 0.2 mm, we find a contact segment of 18 mm. Impression is performed as the first half of this segment passes, thus limiting the contact length to 9 mm. For a ribbon speed of 15 m/min, the duration of contact for impression is limited to 0.03 sec.

Extending the duration of contact can be achieved by causing the ribbon to espouse the form of the roll. The blowing pressure, the diameter of the engraving roll 8, and the space between the rolls 7 that flank the roll 8, are determined in such a way that the arc of contact K between the roll 8 and the ribbon B, both in the case of FIG. 2 and in the case of FIG. 3, has a sufficient angular spread $\alpha$. For an angular spread of $\alpha=0.2$ rad (11°), the contact length for a flat surface of the roll is $\alpha R=40$ mm, resulting in a contact duration of 0.16 s at 15 m/min. This time is to be added to the contact time of the half-segment given by the intersection of the structure of the roll and of the ribbon.

Increasing the diameter of the engraving roll 8 makes it possible to increase the duration of contact for the same angular spread $\alpha$.

Advantageously, the upper wall 15 of the levitation table has a concave shape which espouses the convex arc of the engraving roll 8 to lengthen the zone of contact between ribbon and roll.

Another way of lengthening the duration of contact is for the impression die to have deformable geometry, such as to be a flexible sheet guided by rolls.

The cooling means 12 allows heat to be removed quickly after engraving so as to set the structure and prevent the mean temperature of the ribbon from rising. As a preference, the cooling means 12 is designed to remove a quantity of heat substantially equal to the quantity supplied to the surface layer prior to engraving.

A radiative or convective cooling means may also be provided on the opposite face of the ribbon to the impression face at which the cooling means 12 is located.

One possible exemplary embodiment is given hereinafter, with:

- a ribbon of clear glass 3.5 m wide, 3 mm thick and travelling at a speed of 15 m/min,
- the structure to be impressed on the ribbon requires a depth of 0.2 mm to be heated to the temperature T2 of 830° C.
- Impression is performed on the upper face of the ribbon,
- impression is performed after the LORs but before the start of annealing of the ribbon, the glass being at a temperature T1 of 600° C.,
- a levitation table is placed under the impression roll. It applies a pressure of the order of 5-10 MPa.
- The impression roll is made of ceramic, it has a diameter of 400 mm and is adiabatic overall.
- The distance between the heating zone and the impression point is 10 cm.

According to the method proposed by the invention, the heated length is calculated using an impression number of 0.3 $mm^{-1}$, giving 0.38 m.

The surface temperature is then calculated and found to be 968° C. The energy ratio ER is then calculated and found to be 5.7. The total thermal flux to be injected into the glass over the width of the ribbon is then calculated, using an enthalpy of 609 kJ/kg at 600° C. and of 930 kJ/kg at 830° C. and found to be 223 kW/ml. The flux density is then calculated and found to be 588 $kW/m^2$ in order to obtain the desired temperature of 830° C.

The values obtained are reasonable and technically feasible. There is therefore no need to vary the impression number.

In order to remove the heat energy injected into the ribbon, cooling of both sides of the ribbon is needed. This cooling is described in greater detail hereinafter.

To prove the validity of the simplified approach according to the invention, FIG. 6 sets out a numerical simulation of the range of temperatures obtained with device parameters as described hereinabove.

The diagram of FIG. 6 represents the heat fluxes imposed on the two faces of the ribbon.

In this diagram, the impression point is along the abscissa axis at 1.45 m. The curve Fimp represents the heat flux on the impression face of the ribbon, and the dashed curve Fopp represents that of the opposite face. We can see that the heat flux is transmitted almost constantly. A small amount of cooling is performed on the opposite face after the end of heating whereas rapid cooling is performed on the impression face right from the end of impression.

Figure 7:
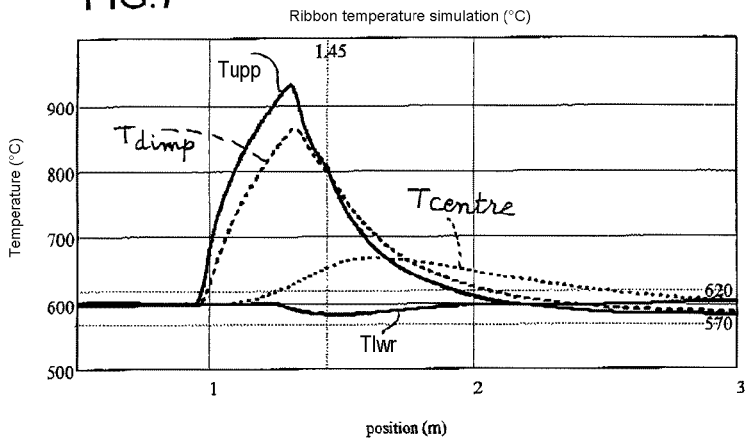
FIG. 7 is a diagram representing, along the ordinate axis, the temperature profiles of the ribbon, as a function of longitudinal position along the abscissa axis.

The graph of FIG. 7 represents the temperature profiles in the ribbon of glass, with the curves Tupp for the temperature of the upper surface, Tlwr for the temperature of the lower surface, Tcentre for the temperature at the centre, and Tdimp for the temperature at the impression depth.

We can seen that, at the impression point, the ribbon is at a temperature of 800° C. at the impression depth (as compared with 830° C. desired). The method of determining the heated length and the thermal flux which was described hereinabove therefore makes it possible rapidly to find the appropriate parameters for the heating of the ribbon. The 30° C. difference will simply entail a small adjustment when the installation is brought into service. The values of 0.38 m and 588 kW/m² determined according to the method of the invention are reasonable and technically feasible.

Another exemplary embodiment of the invention is depicted schematically in FIG. 8. The elements of this example that are identical to or play analogous roles to elements described previously, are denoted by the same references and are not described again.

The engraving roll 8, of a diameter of 40 cm, is positioned above the ribbon B in order to engrave the upper face. The heating means 9 comprises a series of burners 10$a$ slightly inclined with respect to the vertical direction, positioned upstream of the roll 8, above the ribbon B. The flame from the burners is directed downwards onto the ribbon. The carrying rolls have a diameter of 35 cm. The levitation table 14 situated under the ribbon B vertically in line with the roll 8, extends over a distance of 24 cm in the direction of travel. The cooling of the ribbon B downstream of the roll 8 is performed on the upper face by blowing air 12, depicted schematically by arrows, over a length of about 100 cm, and under the lower face, by air jets 12$a$.

According to this example:

Cooling is performed on the impression face by convection over a length of about 100 cm with a flux of around 200 kW/m² and then by radiation (element 13) over a length of 50 cm with a removed flux of around 30 kW/m².

Cooling by radiation using the element 13$a$ and by a small amount of convection using air jets 12$a$ is performed on the lower face under the rolls over a length of 3 m with a removed flux of around 50 kW/m². This device is positioned in such a way that cooling begins at the position 1.3 m in the diagram of FIG. 6.

According to this exemplary embodiment of the invention, the levitation table 14 placed under the impression roll applies a pressure of the order of 5-10 MPa.

The levitation table 14 used for this exemplary embodiment has an area that presses against the ribbon that is equal to 20 times the area of contact between the impression roll and the ribbon, namely 240 mm multiplied by 3.5 m of ribbon width. The pressure that the levitation table has to apply to the ribbon is thus 20 times smaller than the pressure needed between the impression roll and the ribbon. A levitation table generally has an efficiency of the order of 50% (the efficiency of the levitation table being defined as the ratio of the air pressure acting on the object, to the pressure entering the table). It will therefore be supplied by a system of the pump or blower type capable of supplying air at a pressure of 0.5 to 1 MPa (5 to 10 bar).

In general, means, notably pyrometers or thermocouples, for measuring the temperature of the ribbon of glass will be provided at various points on the installation in order to monitor the temperature of the ribbon.

The various options for heating the ribbon of glass are now considered. The heating methods can be classified into:

1/"Surface" Methods:

Infrared (heating by absorption by the glass of radiation in the opaque section)

hot air (convection and conduction at the surface of the glass)

hot gas (radiation, convection and conduction of a combustion)

plasma (ionized gas in contact with the sheet of glass)

These methods are particularly well suited to injecting heat via the surface.

2/Volume Methods

Microwaves (dielectric heating)

Induction (heating for dissipating electrical currents).

These methods are known for their ability to heat materials within their volume. In general, heating thin panels of glass using microwaves or induction raises two major difficulties:

1. Poor absorption and poor efficiency, particular for a glass at low temperature
2. Deep penetration into the volume (instead of limited depth).

The method described hereinafter proposes a solution to these problems.

The power density absorbed by the glass is given by:

$$P = 2\pi \cdot f \cdot \in_0 \in'' \cdot E^2$$

The absorbed power density (P) is therefore dependent on the frequency f of the microwave emitter, on the imaginary permittivity $\in''$ which represents the absorption power of the glass, $\in_0$ being the permittivity of a vacuum, and on the strength of the electric field E.

Glass as a material is a poor absorber of microwaves, similar to frozen water in which the dipoles are set in the matrix. Now, a ribbon of glass, already at a temperature of 600° C., has mobile ions which are better able to absorb microwaves (losses through resonance of the ions and through deformation of the matrix). It is therefore particularly advantageous to heat by microwave a glass ribbon that is already above the transformation point.

The depth to which microwaves penetrate glass follows an exponential law. The attenuation of the depth of penetration is characterized by the value 1/e, e being the mathematical constant of 2.7.

The depth of penetration or of attenuation $d_{1/e}$ at 37% can be determined by $$d_{1/e} = \frac{\lambda_0}{2\pi} \cdot \frac{\sqrt{\varepsilon'}}{\varepsilon''}$$

It is therefore determined by the wavelength $\lambda_0$ in a vacuum, and the real $\in'$ and imaginary $\in''$ permittivities. The permittivities of glass are dependent on the frequency, the composition and the temperature.

The aim advantageously is to have a penetration depth $d_{1/e}$ less than or equal to the impression depth. This depth then determines the frequency and wavelength to be chosen.

The frequency will therefore be determined with:

$$f = \frac{c}{d_{imp} \cdot 2\pi} \cdot \frac{\sqrt{\varepsilon'(f)}}{\varepsilon''(f)}$$

In this formula, c is the speed of light in a vacuum.

The real and imaginary permittivity spectrum is measured beforehand for the intended glass and the intended temperatures. The range of frequencies that are acceptable for obtaining an acceptable power density is then identified (in the case of soda-lime glass, the microwave frequency is advantageously above 10 GHz, the induction frequency advantageously remains below 1 kHz).

Next, using an iterative process, the frequency that best corresponds to the desired impression depth is determined.

All that remains is to check whether the frequency and the desired power is feasible for the design of an emitter (magnetron, gyrotron or the like). Finally, all that remains is to check whether the frequency adopted is available for use, in terms of legislation.

The emitters are then deposited in line before the engraving impression roll in order uniformly to heat across the width of the ribbon. It is particularly advantageous to choose a high power density, injected just before the ribbon is impressed, in order to limit the diffusion of heat into the depth of the sheet.

Application Example

Measuring the permittivity of a ribbon of glass reveals the following values for a frequency of 30 GHz and a temperature of 600° C.: $\varepsilon'=8$, $\varepsilon''=12$.

Calculation of the depth $d_{1/e}$ gives 0.38 mm for a frequency of 30 GHz. The desired impression depth is 0.4 mm. Correcting the frequency slightly to 28 GHz allows this depth to be observed. Checking the permittivity yields a negligible variation in the values. A successive iteration for determining the frequency is no longer needed in this case.

The variation of the permittivity of the glass as a function of temperature possibly requires a correction of the values particularly if the impression temperature is well above 600° C.

The description has been given with regard to a horizontal ribbon of float glass. However, the engraving method of the invention is not restricted to a horizontal ribbon but may also be applied to the engraving of one face of a vertical ribbon of glass produced using a different method.

The invention makes it possible to obtain a ribbon of glass that has one smooth face and the other face equipped with a precise and organized structure in order to afford an antireflection effect and allow the maximum amount of light flux to enter the ribbon and reach the other face.

The glass panels thus obtained are intended mainly for the production of photovoltaic modules that may also be used for creating solar heating panels, flat screens, optoelectronic substrates and decorative glasses.

The invention claimed is:

1. A method for continuously creating a structure on a face of a ribbon of glass using an impression device, wherein:
   the impression device is positioned in a zone situated after a bath of tin on which the ribbon is formed, wherein between the bath of tin and the impression device, the ribbon is at a mean temperature T1 that is insufficient for impressing onto the ribbon a pattern of the impression device according to the nature of the pattern to be engraved, a pressure between the impression device and the ribbon, and a duration of contact between the ribbon and the impression device,
   the face of the ribbon that is to be engraved is heated by a heating device upstream of the impression device so as to raise, at a start of impression, a partial thickness of the ribbon to a temperature T2>T1 that is sufficient for impressing onto the ribbon the pattern from the impression device according to the nature of the pattern to be engraved, the pressure between the impression device and the ribbon, and the duration of contact between the ribbon and the impression device, and the structure is engraved onto the face of the ribbon by the pattern of the impression device,
   and, during the heating, a thermal flux, $q_{ht}$, is transmitted to the ribbon by the heating device over a length in the direction of travel, $length_{heated}$, wherein the values of the thermal flux and the heated length are determined by the steps of:
   selecting an "impression number", $N_{imp}$, which ranges between 0.05 mm$^{-1}$ and 2.00 mm$^{-1}$, the "impression number" $N_{imp}$ being defined by the formula:

$$N_{imp} = \frac{depth_{T2}}{diffusivity_{thermal}} \cdot \frac{speed}{length_{heated}},$$

where $depth_{T2}$ denotes a thickness of glass to be raised to the temperature T2 in order to impress the structure, speed denotes a speed of travel of the glass ribbon, and $diffusivity_{thermal}$ denotes the thermal diffusivity of the glass,
   calculating $length_{heated}$ based on the selected $N_{imp}$ value and known values of $depth_{T2}$, $diffusivity_{thermal}$, and speed,
   calculating the thermal power to be injected per meter width of ribbon, $Q_{imp}$, from the formula:

$Q_{imp} = ER \cdot (Hg(T2) - Hg(T1)) \cdot speed \cdot depth_{T2} \cdot density_{glass}$, where Hg(T2) and Hg(T1) are an enthalpy of the glass at a temperature T2 and a temperature T1, respectively, and where ER is an energy ratio determined from the calculated $length_{heated}$ value by the formula:

$$ER = 4.21 \cdot 10^{-2} \cdot \left[ \frac{depth_{T2}^2 \cdot speed}{(6.67 \cdot 10^{20} \cdot length_{heated} + 2 \cdot 10^{21} \cdot dist_{imp}) \cdot diffusivity_{thermal}} \right]^{-0.3397},$$

and
   determining the thermal flux, $q_{ht}$, from the calculated values of $Q_{imp}$ and $length_{heated}$ by the formula:

$$q_{ht} = \frac{Q_{imp}}{length_{heated}}.$$

2. The method according to claim 1, wherein the face on which the structure is engraved is one of the upper face or the lower face of the ribbon, and the face on which the structure is engraved is rapidly cooled after the impression device in order rapidly to stabilize the engraved structure and return the ribbon to a temperature close to T1.

3. The method according to claim 1, wherein the ribbon comprises soda-lime glass, and the temperature T2 ranges between 650° C. and 1100° C.

4. The method according to claim 1, wherein the ribbon comprises soda-lime glass, and the temperature T1 is 620° C. or below, and above 570° C.

5. The method according to claim 1, wherein the "impression number" $N_{imp}$ is 0.3 mm$^{-1}$.

6. The method according to claim 1, wherein the face of the ribbon is pressed against the impression device by pressurized gas directed onto an opposite face of the ribbon, so that the structure is engraved onto the face of the ribbon by the pattern of the impression device.

7. The method according to claim 6, wherein the impression device comprises a roll, and the pressurized gas extends the duration of contact between the ribbon and the impression device by causing the face of the ribbon to contact the impression device over an arc of contact.

8. The method according to claim 7, wherein the arc of contact has an arc angle of about 11°.

9. A method of continuously creating a structure on a face of a ribbon of float glass using an impression device in a zone situated after a bath of tin on which the ribbon is formed, wherein the ribbon of glass is conveyed through the zone in a horizontal plane, the impression device is disposed either above or below the horizontal plane, and a blowing means is provided in the re ion of the impression device and is configured to blow pressurized gas onto a face of the ribbon opposite to the impression device, wherein between the bath of tin and the impression device, the ribbon is at a mean temperature T1 insufficient for a pattern of the impression device to be impressed onto the ribbon according to the nature of the pattern to be engraved, a pressure between the impression device and the ribbon, and a duration of contact between the ribbon and the impression device, and wherein:

the face of the ribbon to be engraved is heated by a heating device upstream of the impression device so as to raise, at a start of impression, a partial thickness of the ribbon to a temperature T2>T1 that is sufficient for impressing the pattern of the impression device onto the ribbon according to the nature of the pattern to be engraved, the pressure between the impression device and the ribbon, and the duration of contact between the ribbon and the impression device, a thermal flux is transmitted to the ribbon by induction or by microwaves at a frequency that is suitably chosen to limit absorption of the thermal flux to the partial thickness of the ribbon, and the face of the ribbon is pressed against the impression device by pressurized gas directed onto an opposite face of the ribbon by the blowing means, so that the structure is engraved onto the face of the ribbon by the pattern of the impression device.

10. The method according to claim 9, wherein the impression device comprises a roll, and the pressurized gas extends the duration of contact between the ribbon and the impression device by causing the face of the ribbon to contact the impression device over an arc of contact.

11. The method according to claim 9, wherein the face on which the structure is engraved is one of the upper face or lower face of the ribbon, and the face on which the structure is engraved is rapidly cooled after the impression device in order rapidly to stabilize the engraved structure and return the ribbon to a temperature close to T1.

12. The method according to claim 9, wherein the ribbon comprises soda-lime glass, and the temperature T2 ranges between 650° C. and 1100° C.

13. The method according to claim 9, wherein the ribbon comprises soda-lime glass, and the temperature T1 is 620° C. or below, and above 570° C.

* * * * *